United States Patent [19]

Jekel et al.

[11] 4,450,456

[45] May 22, 1984

[54] CASSETTE COMPRISING A CAPPING DEVICE AND A CLEANING DEVICE FOR AN INK JET PRINTER

[75] Inventors: Gerd Jekel; Franz Obenaus, both of Vienna, Austria

[73] Assignee: U.S. Philips Corporation, New York, N.Y.

[21] Appl. No.: 393,203

[22] Filed: Jun. 28, 1982

[30] Foreign Application Priority Data

Jul. 21, 1981 [AT] Austria ................................ 3220/81

[51] Int. Cl.³ .............................................. G01D 15/18

[52] U.S. Cl. ................................ 346/140 R; 400/126

[58] Field of Search .............. 346/75, 140 R; D14/11; 400/126; 360/134

[56] References Cited

U.S. PATENT DOCUMENTS 4,223,322 9/1980 van Raamsdonk ............ 346/140 R 4,369,456 1/1983 Cruz-Uribe et al. ............ 346/140 R

*Primary Examiner*—Reinhard J. Eisenzopf

*Assistant Examiner*—Gerald E. Preston

*Attorney, Agent, or Firm*—Norman N. Spain

[57] ABSTRACT

The capping device of a cassette comprising a capping device and a cleaning device for the capping and cleaning, respectively, of the jet nozzle surface (8) of a printing head (3) of an ink jet printer comprises a drivable capping cushion (14) having an endless surface (13) and the cleaning device comprises a drivable cleaning tape (17). The capping device and the cleaning device are accessible in a capping position (10) and a cleaning position (12) through a window (9, 11, respectively) in a cassette wall (7). For the driving of the cleaning tape, the cassette comprises two rollers (18, 19) which cooperate at their circumference and wherebetween the cleaning tape (17) passes. One of these rollers (18) can be coupled to a drive device of the ink jet printer. The cleaning tape coming from the feed reel first passes a part of the surface of the capping cushion and via the cleaning position to the two rollers whereby the tape is fed to a storage space (20) formed in the cassette.

5 Claims, 3 Drawing Figures

CASSETTE COMPRISING A CAPPING DEVICE AND A CLEANING DEVICE FOR AN INK JET PRINTER

The invention relates to a cassette comprising a capping device and a cleaning device for the capping and cleaning, respectively, of the jet nozzle surface of a printing head of an ink jet printer, said capping device comprising a drivable capping cushion which has an endless surface and which is passed along a capping position which is accessible through a window in a cassette wall, the cleaning device comprising a drivable cleaning tape which can be unwound from a feed reel and which is passed along a cleaning position which is accessible through a window in the same cassette wall and which is also passed along a part of the capping cushion in order to remove contaminations from the surface of the capping cushion. A cassette of this kind which is known from U.S. Pat. No. 4,223,322 comprises a feed reel and a drivable take-up reel for the cleaning tape, the cleaning tape being passed along the cleaning position between said reels. The capping cushion may be designed as a band or a roller, one side of the cleaning tape being passed along a part of the surface of the capping cushion, its other side which faces the jet nozzle surface of the printing head being passed along the cleaning position; this implies a comparatively complex path for the cleaning tape. Therefore, a cassette of this kind is comparatively expensive because the cassette is preferably completely replaced by a new cassette after the cleaning tape has been used up.

It is an object of the invention to provide a cassette of the kind set forth whose construction is very simple and hence very cheap and which nevertheless satisfies the requirements imposed.

To this end, the cassette in accordance with the invention is characterized in that for the driving of the cleaning tape, the cassette comprises two rotatably journalled rollers which cooperate at their circumference and wherebetween the cleaning tape passes, it being possible to couple one of said rollers to a drive device of the ink jet printer, the cleaning tape coming from the feed reel first being passed along a part of the surface of the capping cushion and subsequently via the cleaning position to the two rollers, after which the tape is fed to a storage space formed in the cassette. A very simple and exact path for the cleaning tape is thus obtained, and also a simple and safe drive, without a take-up reel being required. The simple path for the cleaning tape also offers the advantage that the tape can be driven with a low force, so that there is no risk of tearing of the comparatively thin and vulnerable cleaning tape. Thus, the overall construction is very simple so that such a cassette can be very cheaply manufactured, notably in series production. The fact that the same side of the cleaning tape passes along the surface of the capping cushion as well as through the cleaning position while facing the jet nozzle surface of the printing head, has not been found to form a drawback in practice, because on the one hand the contamination of the capping cushion by the ink is not very serious whilst on the other hand a customarily used cleaning tape always retains a high absorbency, even when it is contaminated by some ink. Consequently, a satisfactory effect of the cleaning tape in the cleaning position is ensured.

A drive for the capping cushion can be derived from the drive for the cleaning tape by means of a drive device; this is known per se from said U.S. Pat. No. 4,223,322. In such a case it has been found to be particularly attractive to provide a drive device which acts between one of the two rollers and the capping cushion and which drives the surface of the capping cushion in the opposite direction with respect to the movement direction of the cleaning tape during the driving of this tape. Such an opposed movement provides particularly thorough cleaning of the surface of the capping cushion by the cleaning tape.

It has also been found to be very attractive to provide a drive device which acts between one of the two rollers and the capping cushion and which drives the surface of the capping cushion at a speed which exceeds that of the cleaning tape. It is thus ensured that during a comparatively small displacement of the cleaning tape (which is usually sufficient because the jet nozzle surface to be cleaned is not very large) always a substantially larger surface area of the capping cushion is cleaned, so that the cleaning of this surface is substantially improved without using more cleaning tape than the amount required for the cleaning of the jet nozzle surface.

It is also advantageous to provide a tape tension sensor which is arranged inside the cassette so that it is displaceable against the force of a spring and which cooperates with the cleaning tape before the tape reaches the rollers, said sensor being capable of activating a signalling device in order to supply a signal when the cleaning tape has been fully unwound from the feed reel. It can thus be simply determined when a cassette is no longer suitable for use and must be replaced by a new cassette. The reliability of an ink jet printer utilizing such a cassette is thus substantially increased, because it is very important that always an operational cassette is available for thorough cleaning and capping of the jet nozzle surface of the printing head of the ink jet printer.

The arrangement of the tape tension sensor in the cassette offers the advantage that the sensor functions directly instead of being brought into effective contact with the cleaning tape only when the cassette is inserted in the ink jet printer, as would be the case if this sensor were arranged on the ink jet printer proper. This step can also offer a further advantage. To this end, the signalling device comprises a visual indicator which is linked to the tape tension sensor and which can be observed through a viewing window provided in the cassette. It can thus be directly established whether a cassette is operational, even when it is not arranged in an ink jet printer.

The invention will be described in detail hereinafter with reference to the drawing which shows an embodiment in accordance with the invention.

Figure 1:
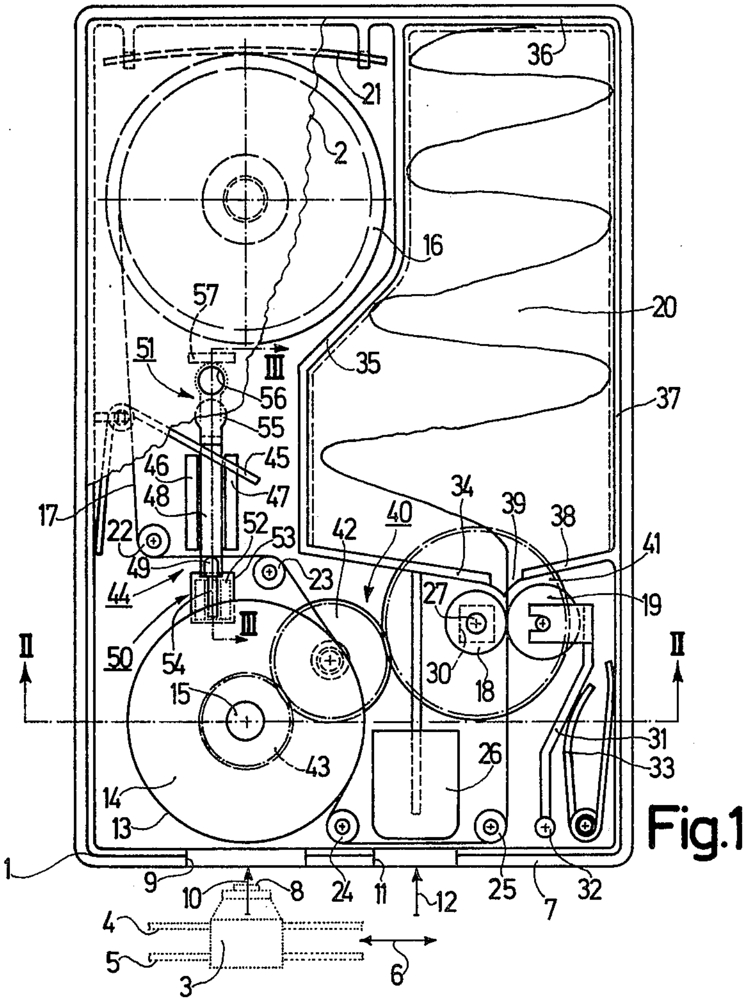
FIG. 1 is a plan view of a cassette with a lid which has been mainly broken away.
Figure 2:
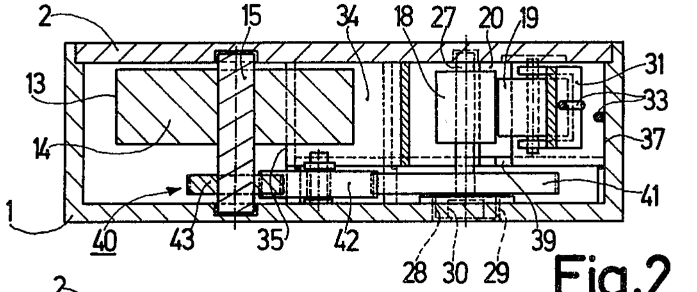
FIG. 2 is a sectional view, taken along the line II—II in FIG. 1, of the cassette shown in FIG. 1; some parts of the cassette which are situated behind the sectional plane having been omitted for the sake of clarity.

The reference numeral 1 in the Figures denotes a housing section and the reference numeral 2 denotes a lid which is arranged thereon. These components form part of a cassette comprising a capping device for the capping and a cleaning device for the cleaning of the jet nozzle surface of a printing head of an ink jet printer.

The dotted lines in FIG. 1 denote such a printing head 3 which can be displaced in the direction of the double arrow 6 on two guide rods 4 and 5. The printing head 3 can first of all be displaced along the cassette wall 7, after which it reaches an area beyond the cassette in which the head can be linearly displaced with respect to a record carrier (not shown) in order to print the relevant characters thereon. To this end, ink droplets are ejected in the correct sequence from jet nozzles which are arranged in a jet nozzle surface 8 of the printing head. Because such jet nozzles have a very small inner diameter and are subject to contamination or clogging by ink, periodic removal of ink adhering to the jet nozzle surface 8 is necessary; the surface must also be thoroughly capped when no ink is to be ejected from the jet nozzles for a prolonged period of time, thus capping the jet nozzle apertures. This is achieved by means of the cassette shown which comprises a capping position which is accessible through a window 9 in the cassette wall 7 and which is indicated by the arrow 10, and a cleaning position which is accessible through a window 11 in the same cassette wall 7 and which is indicated by the arrow 12. Obviously, alternatively only one window could be provided in the cassette wall 7 for both positions. FIG. 1 shows the printing head 3 in the position opposite the capping position 10. When the jet nozzle surface 8 is to be cleaned, the printing head 3 is displaced on the guide rods 4 and 5 until it is situated in front of the window 11. The jet nozzle surface 8 is capped and cleaned by displacement of the cassette in the direction of the printing head 3 so that the capping device and the cleaning device, respectively, come into active contact with the jet nozzle surface 8. Such a displacement of the cassette can be obtained, for example, by arranging it in a displaceable slide which is mounted on the ink jet printer.

The capping device accommodated in the cassette comprises a drivable capping cushion 14 which has an endless surface 13 which is passed along the window 9 in the cassette wall 7. In the present embodiment, the capping cushion is formed by a roller which may be made of silicon rubber in known manner. However, it is alternatively possible to construct the capping cushion as an endless band. The capping cushion 14 is mounted on a shaft 15 which is rotatably journalled in the housing section 1 and the lid 2. The cleaning device comprises a drivable cleaning tape 17 which can be unwound from a feed reel 16 which is rotatably journalled in the cassette and which is passed along the window 11 in the cassette wall 7. For the removal of contaminations from the surface 13 of the capping cushion 14, the cleaning tape 17 is also passed over a part of this surface. Such a cleaning tape may consist of an absorbing, non-fibrous paper in known manner. For the driving of the cleaning tape 17, the cassette comprises two rotatably journalled rollers 18 and 19 which cooperate at their circumference and wherebetween the cleaning tape passes, it being possible to couple one of said rollers to a drive device (not shown) of the ink jet printer. It is also ensured that the cleaning tape 17 coming from the feed reel 16 is first passed along a part of the surface 13 of the capping cushion 14 and subsequently along the window 11 in the cassette wall 7 (along the cleaning position 12) to the two rollers 18 and 19 which feed the tape to a storage space 20 formed in the cassette. A very simple path is thus obtained for the cleaning tape. Moreover, the force required for the driving of the cleaning tape is comparatively small, so that there is no risk of tearing of the comparatively thin and vulnerable cleaning tape. In order to keep the cleaning tape tensioned there is provided a brake which is formed by a leaf spring 21 and which cooperates with the feed reel 16. For a proper definition of said path of the cleaning tape within the cassette, a pair of guide rollers 22 and 23 are arranged behind the feed reel 16, viewed in the movement direction of the tape, whilst behind the capping cushion 14 there are arranged a further pair of guide rollers 24 and 25. Between the guide rollers 24 and 25 the cleaning tape is guided along the cassette wall 7, the tape thus passing the window 11 in this wall and hence also the cleaning position 12. In order to support the cleaning tape at the area of the cleaning position 12 when the tape is pressed against the jet nozzle surface 8 during a cleaning operation, an elastic cushion 26 is provided at its side which is remote from the window 11.

The roller 18 serves as a drive roller and the roller 19 serves as a pressure roller. To this end, the roller 18 is arranged on a shaft 27 which is rotatably journalled in the housing section 1 and the lid 2, a coupling element 28 being situated within a recess 29 in the housing section 1 so that it is accessible from outside the cassette. Via the coupling element 28 the coupling to a drive device of the ink jet printer is established; to this end, the coupling element 28 of the present embodiment comprises a centric cavity 30 having a rectangular crosssection. A connection to a correspondingly shaped shaft of the drive device of the ink jet printer can thus be established. Obviously, within the scope of the customary techniques there are a number of alternatives for establishing such a coupling for the driving of the roller 18.

The roller 19 is rotatably journalled in a fork-shaped end of an arm 31 which itself is rotatably arranged in the cassette by way of a shaft 32. An expanding spring 33 acts on the arm 31 so that the roller 19 is pressed in the direction of the roller 18. A cleaning tape passing between the rollers 18 and 19 is thus simply and safely driven by the driving of the roller 18 in order to be fed to the storage space 20 behind the rollers 18 and 19. The storage space 20 is formed by a compartment which is bounded by the cassette walls 34, 35, 36, 37 and 38 and in which there is arranged an intermediate bottom 39 for adaptation to the width of the cleaning tape. The inlet opening for the cleaning tape 17 is provided between the walls 34 and 38.

The capping cushion 14 could be driven, for example, by its own drive which is independent of the drive of the cleaning tape. In the described embodiment, however, the drive for the capping cushion is derived in known manner from the drive for the cleaning tape. To this end there is provided a drive device 40 which acts between the roller 18 and the capping cushion 14. The drive device 40 comprises a gearwheel 41 which is mounted on the shaft 27 of the roller 18 and which engages an idler gearwheel 42 which is rotatably journalled in the cassette and which itself is in operative connection with a gearwheel 43 which is mounted on the shaft 15 of the capping cushion 14. Due to the presence of the idler gearwheel 42, the surface 13 of the capping cushion 14 is driven in the opposite direction with respect to the movement direction of the cleaning tape when the latter is driven. This opposed movement causes a very good cleaning effect on the surface 13 of the capping cushion 14 by the cleaning tape passed therealong. Furthermore, the transmission ratio from the drive roller 18 to the capping cushion 14 is chosen, via the drive device 40, so that the surface 13 of the capping cushion 14 is driven at a speed which is higher than that of the cleaning tape 17. It has been found that the speed of the surface 13 of the capping cushion 14 is preferably chosen to be about ten times higher than the speed of the cleaning tape 17. With a comparatively small supply of cleaning tape 17, a comparatively large part of the surface 13 of the capping cushion 14 is then passed along the cleaning tape, so that the cleaning of the capping cushion is very effective, even when the cleaning tape is advanced by only a comparatively small amount in order to bring fresh cleaning tape in the cleaning position. Obviously, the drive device 40 could alternatively be constructed in a different manner. For example, instead of gearwheels, friction wheels could be used or the drive device could be constructed as a belt drive.

As regards the common driving of the roller 18 and the capping cushion 14 it is to be noted that this drive can be realized via said shaft of the drive device of the ink jet printer, for example, by means of its own motor which is switched on for the period of time required for the feeding of the cleaning tape. It has also been found that the drive for this shaft can be very simply derived from the adjustment motion of the cassette, driving preferably taking place when the cassette is moved away from the printing head, because in that case either a capping operation or a cleaning operation has taken place immediately before that, so that immediately thereafter the capping cushion is cleaned and a fresh part of the cleaning tape is positioned.

The cassette also comprises a tape tension sensor 44 which cooperates with the cleaning tape 17. The sensor consists of a slide 48 which is subject to an expanding spring 45 and which is linearly guided between two strips 46 and 47 on the housing section 1, said slide comprising a pin-shaped protrusion 49 which cooperates with the cleaning tape 17 between the guide rollers 22 and 23. In the present embodiment, the tape tension sensor 44 can advantageously operate two signalling devices 50 and 51 as soon as the cleaning tape has been fully unwound from the feed reel 16.

Figure 3:
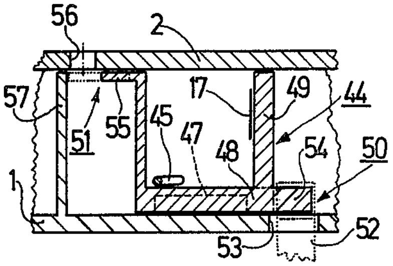
FIG. 3 is a detailed sectional view, taken along the line III—III in FIG. 1, of a tape tension sensor arranged in the cassette shown in FIG. 1.

The signalling device 50 comprises an electro-optical detector 52 which is mounted on the ink jet printer and which is symbolically denoted by dotted lines in the FIGS. 1 and 3. The detector comprises a customary fork-shaped holder which can enter the interior of the cassette via an opening 53 in the housing section 1, a light source and a light detector being arranged opposite one another. The light beam from the light source to the light detector can be interrupted by a protrusion 54 on the slide 48. The other signalling device 51 consists of a visual indicator 55 which is linked to the slide 48 of the tape tension sensor and which can be observed through a viewing window 56 provided in the lid 2 of the cassette.

When an operational cleaning tape 17 is present in the cassette, the tape tension sensor 44 occupies the position shown in the FIGS. 1 and 3 in which the protrusion 54 is situated between the fork-shaped ends of the electro-optical detector 52, the (possibly coloured) visual indicator 55 being situated outside the window 56. Consequently, the detector does not supply a signal; this may be interpreted by the ink jet printer as that the apparatus is ready for operation, because cleaning tape is present. Moreover, the operator of the ink jet printer can see through the window 56 that cleaning tape is indeed present. When the cleaning tape 17 has been fully unwound from the feed reel 16, the slide 48 is displaced in the direction of an abutment 57 on the housing section 1 under the influence of the spring 45, with the result that the protrusion 54 is pulled out of the detector 52 and the visual indicator 55 is slid to a position in front of the viewing window 56. The detector 52 then supplies a signal which may serve to indicate that the cassette is to be replaced or that the apparatus is no longer operational. Moreover, the operator of the apparatus can see through the viewing window 56, now displaying the visual indicator 55, that no further cleaning tape is present. The tape tension sensor 44 in the cassette and the signalling device 51 formed by a visual indicator offer the further advantage that it is directly indicated on the cassette whether an operational cleaning tape is present therein, even when the cassette is not fitted in an ink jet printer.

Obviously, various embodiments of such a tape tension sensor 44 are feasible within the scope of the customary techniques, for example, in the form of a rotatable lever. The tape tension sensor may alternatively cooperate with the cleaning tape in a location other than the location described herein, provided that such cooperation takes place before the rollers 18 and 19 where the cleaning tape is subject to tension.

As appears from the foregoing, a series of modifications are feasible for the described embodiment. It is also to be noted that the rollers 18, 19 for driving the cleaning tape need not necessarily have a smooth surface but may be provided, for example, with grooves or may be constructed as gearwheels. If desired, both rollers can be driven. The driving of the capping cushion can alternatively be performed so that its surface moves in the same direction as the cleaning tape.

What is claimed is:

1. A cassette comprising a capping device and a cleaning device for the capping and cleaning, respectively, of the jet nozzle surface (8) of a printing head (3) of an ink jet printer, said capping device comprising a drivable capping cushion (14) having an endless surface (13) and means for passing said endless surface (13) of said capping cushion (14) along a capping position (10) accessible through a window (9) in a wall (7) of said cassette, said cleaning device comprising a drivable cleaning tape (17), driving means for unwinding said cleaning tape (17) from a feed reel (16), for passing said cleaning tape (17) along a cleaning position (12) accessible through a window (17) in said wall (7) and for passing said cleaning tape (17) along a part of the surface (17) of said capping cushion (14) in order to remove contaminations from said surface (13), characterized in that said driving means comprises two rotatably journalled rollers (18, 19) cooperating at their circumferences to drive said cleaning tape (17), passing between and contacting said cooperating circumferences, from said feed reel (16), first along a part of the surface (13) of said capping cushion (14), subsequently through the cleaning position (12) to said rollers (18, 19) and then to a storage space (20) formed in said cassette and wherein one of said rollers (18, 19) may be coupled to a drive device of said ink jet printer.

2. The cassette of claim 1 further characterized in that there is provided a drive device (40) cooperating with said roller (18) and said capping cushion (14) to drive the surface (13) of said capping cushion (14) in the opposite direction with respect to the direction of movement of the cleaning tape (17) during movement of said tape.

3. The cassette as claimed in claim 1 or 2 characterized in that the drive device (40) drives the surface (13) of the capping cushion at a speed in excess of that of the cleaning tape (17).

4. A cassette as claimed in claim 1, characterized in that before the leaning tape (17) reaches the two rollers (18, 19) it cooperates with a tape tension sensor (44) which is arranged inside the cassette so that it is displaceable against the force of a spring (45), said sensor being capable of activating a signalling device (51) in order to supply a signal when the cleaning tape (17) has been fully unwound from the feed reel (16).

5. A cassette as claimed in claim 4, characterized in that the signalling device (51) comprises a visual indicator (55) which is linked to the tape tension sensor (44) and which can be observed through a viewing window (56) provided in the cassette.

* * * * *